United States Patent
Hinman et al.

(10) Patent No.: US 9,949,147 B2
(45) Date of Patent: *Apr. 17, 2018

(54) SYSTEM AND METHOD FOR DUAL-BAND BACKHAUL RADIO

(71) Applicant: Mimosa Networks, Inc., Santa Clara, CA (US)

(72) Inventors: Brian L. Hinman, Los Gatos, CA (US); Jaime Fink, San Francisco, CA (US); Mustafa Rangwala, Sunnyvale, CA (US)

(73) Assignee: Mimosa Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/246,094

(22) Filed: Aug. 24, 2016

(65) Prior Publication Data

US 2016/0366601 A1 Dec. 15, 2016

Related U.S. Application Data

(63) Continuation of application No. 14/833,038, filed on Aug. 21, 2015, which is a continuation of application
(Continued)

(51) Int. Cl.
*H04W 24/02* (2009.01)
*H04B 7/0413* (2017.01)
(Continued)

(52) U.S. Cl.
CPC .......... *H04W 24/02* (2013.01); *H04B 1/0475* (2013.01); *H04B 7/0413* (2013.01);
(Continued)

(58) Field of Classification Search
None
See application file for complete search history.

(56) References Cited

U.S. PATENT DOCUMENTS 2,735,993 A 2/1956 Humphrey
3,182,129 A 5/1965 Clark et al.
(Continued)

FOREIGN PATENT DOCUMENTS

CN 104335654 A 2/2015
CN 303453662 S 11/2015
(Continued)

OTHER PUBLICATIONS

Final Office Action, dated Oct. 17, 2016, U.S. Appl. No. 14/639,976, filed Mar. 5, 2015.
(Continued)

*Primary Examiner* — Adnan Baig
(74) *Attorney, Agent, or Firm* — Carr & Ferrell LLP

(57) ABSTRACT

A method and system are provided. The system includes a communication system including a first transmitter/receiver operating on a first frequency and a second transmitter/receiver operating on a second frequency. The system also includes a controller monitoring at least one of interference and throughput on the first and second transmitter/receiver and shifting demand based on the monitoring.

21 Claims, 5 Drawing Sheets

Related U.S. Application Data

No. 14/183,329, filed on Feb. 18, 2014, now Pat. No. 9,191,081.

(60) Provisional application No. 61/775,408, filed on Mar. 8, 2013.

(51) Int. Cl.

| | | |
|---|---|---|
| *H04B 7/06* | (2006.01) | |
| *H04B 1/04* | (2006.01) | |
| *H04B 7/04* | (2017.01) | |
| *H04W 24/08* | (2009.01) | |
| *H04W 36/20* | (2009.01) | |
| *H04W 72/04* | (2009.01) | |
| *H04W 8/26* | (2009.01) | |

(52) U.S. Cl.
CPC ........... *H04B 7/0469* (2013.01); *H04B 7/068* (2013.01); *H04W 8/26* (2013.01); *H04W 24/08* (2013.01); *H04W 36/20* (2013.01); *H04W 72/0453* (2013.01)

(56) References Cited

U.S. PATENT DOCUMENTS

| | | |
|---|---|---|
| 4,188,633 A | 2/1980 | Frazita |
| 4,402,566 A | 9/1983 | Powell et al. |
| D273,111 S | 3/1984 | Hirata et al. |
| 4,543,579 A | 9/1985 | Teshirogi |
| 4,626,863 A | 12/1986 | Knop et al. |
| 4,835,538 A | 5/1989 | McKenna et al. |
| 4,866,451 A | 9/1989 | Chen |
| 4,893,288 A | 1/1990 | Maier et al. |
| 4,903,033 A | 2/1990 | Tsao et al. |
| 4,986,764 A | 1/1991 | Eaby et al. |
| 5,015,195 A | 5/1991 | Piriz |
| 5,226,837 A | 7/1993 | Cinibulk et al. |
| 5,231,406 A | 7/1993 | Sreenivas |
| D346,598 S | 5/1994 | McCay et al. |
| D355,416 S | 2/1995 | McCay et al. |
| 5,389,941 A | 2/1995 | Yu |
| 5,491,833 A | 2/1996 | Hamabe |
| 5,513,380 A | 4/1996 | Ivanov et al. |
| 5,561,434 A | 10/1996 | Yamazaki |
| D375,501 S | 11/1996 | Lee et al. |
| 5,580,264 A | 12/1996 | Aoyama et al. |
| 5,684,495 A | 11/1997 | Dyott et al. |
| D389,575 S | 1/1998 | Grasfield et al. |
| 5,724,666 A | 3/1998 | Dent |
| 5,742,911 A | 4/1998 | Dumbrill et al. |
| 5,746,611 A | 5/1998 | Brown et al. |
| 6,014,372 A | 1/2000 | Kent et al. |
| 6,067,053 A | 5/2000 | Runyon et al. |
| 6,137,449 A | 10/2000 | Kildal |
| 6,140,962 A | 10/2000 | Groenenboom |
| 6,176,739 B1 | 1/2001 | Denlinger et al. |
| 6,216,266 B1 | 4/2001 | Eastman et al. |
| 6,304,762 B1 | 10/2001 | Myers et al. |
| D455,735 S | 4/2002 | Winslow |
| 6,421,538 B1 | 7/2002 | Byrne |
| 6,716,063 B1 | 4/2004 | Bryant et al. |
| 6,754,511 B1 | 6/2004 | Halford et al. |
| 6,847,653 B1 | 1/2005 | Smiroldo |
| D501,848 S | 2/2005 | Uehara et al. |
| 6,877,277 B2 | 4/2005 | Kussel et al. |
| 6,962,445 B2 | 11/2005 | Zimmel et al. |
| 7,075,492 B1 | 7/2006 | Chen et al. |
| D533,899 S | 12/2006 | Ohashi et al. |
| 7,173,570 B1 | 2/2007 | Wensink et al. |
| 7,193,562 B2 | 3/2007 | Shtrom et al. |
| 7,212,163 B2 | 5/2007 | Huang et al. |
| 7,245,265 B2 | 7/2007 | Kienzle et al. |
| 7,253,783 B2 | 8/2007 | Chiang et al. |
| 7,264,494 B2 | 9/2007 | Kennedy et al. |
| 7,281,856 B2 | 10/2007 | Grzegorzewska et al. |
| 7,292,198 B2 | 11/2007 | Shtrom et al. |
| 7,306,485 B2 | 12/2007 | Masuzaki |
| 7,324,057 B2 | 1/2008 | Argaman et al. |
| D566,698 S | 4/2008 | Choi et al. |
| 7,362,236 B2 | 4/2008 | Hoiness |
| 7,369,095 B2 | 5/2008 | Hirtzlin et al. |
| 7,380,984 B2 | 6/2008 | Wuester |
| 7,431,602 B2 | 10/2008 | Corona |
| 7,498,996 B2 | 3/2009 | Shtrom et al. |
| 7,507,105 B1 | 3/2009 | Peters et al. |
| 7,542,717 B2 | 6/2009 | Green, Sr. et al. |
| 7,581,976 B2 | 9/2009 | Liepold et al. |
| 7,586,891 B1 | 9/2009 | Masciulli |
| 7,616,959 B2 | 11/2009 | Spenik et al. |
| 7,675,473 B2 | 3/2010 | Kienzle et al. |
| 7,726,997 B2 | 6/2010 | Kennedy et al. |
| 7,778,226 B2 | 8/2010 | Rayzman et al. |
| 7,857,523 B2 | 12/2010 | Masuzaki |
| 7,929,914 B2 | 4/2011 | Tegreene |
| RE42,522 E | 7/2011 | Zimmel et al. |
| 8,009,646 B2 | 8/2011 | Lastinger et al. |
| 8,069,465 B1 | 11/2011 | Bartholomay et al. |
| 8,111,678 B2 | 2/2012 | Lastinger et al. |
| 8,270,383 B2 | 9/2012 | Lastinger et al. |
| 8,325,695 B2 | 12/2012 | Lastinger et al. |
| D674,787 S | 1/2013 | Tsuda et al. |
| 8,345,651 B2 | 1/2013 | Lastinger et al. |
| 8,482,478 B2 | 7/2013 | Hartenstein |
| 8,515,434 B1 | 8/2013 | Narendran et al. |
| 8,515,495 B2 | 8/2013 | Shang et al. |
| D694,740 S | 12/2013 | Apostolakis |
| 8,777,660 B2 | 7/2014 | Chiarelli et al. |
| 8,792,759 B2 | 7/2014 | Benton et al. |
| 8,827,729 B2 | 9/2014 | Gunreben et al. |
| 8,836,601 B2 | 9/2014 | Sanford et al. |
| 8,870,069 B2 | 10/2014 | Bellows |
| 8,935,122 B2 | 1/2015 | Stisser |
| 9,001,689 B1 | 4/2015 | Hinman et al. |
| 9,019,874 B2 | 4/2015 | Choudhury et al. |
| 9,077,071 B2 | 7/2015 | Shtrom et al. |
| 9,130,305 B2 | 9/2015 | Ramos et al. |
| 9,161,387 B2 | 10/2015 | Fink et al. |
| 9,179,336 B2 | 11/2015 | Fink et al. |
| 9,191,081 B2 | 11/2015 | Hinman et al. |
| D752,566 S | 3/2016 | Hinman et al. |
| 9,295,103 B2 | 3/2016 | Fink et al. |
| D227,476 S | 6/2016 | Kennedy |
| 9,362,629 B2 | 6/2016 | Hinman et al. |
| 9,391,375 B1 | 7/2016 | Bales et al. |
| 9,407,012 B2 | 8/2016 | Shtrom et al. |
| 9,431,702 B2 | 8/2016 | Hartenstein |
| 9,504,049 B2 | 11/2016 | Hinman et al. |
| 9,531,114 B2 | 12/2016 | Ramos et al. |
| 9,537,204 B2 | 1/2017 | Cheng et al. |
| 9,693,388 B2 | 6/2017 | Fink et al. |
| 9,780,892 B2 | 10/2017 | Hinman et al. |
| 9,843,940 B2 | 12/2017 | Hinman et al. |
| 9,871,302 B2 | 1/2018 | Hinman et al. |
| 9,888,485 B2 | 2/2018 | Hinman et al. |
| 2001/0033600 A1 | 10/2001 | Yang et al. |
| 2002/0102948 A1 | 8/2002 | Stanwood et al. |
| 2002/0159434 A1 | 10/2002 | Gosior et al. |
| 2003/0013452 A1 | 1/2003 | Hunt et al. |
| 2003/0027577 A1 | 2/2003 | Brown et al. |
| 2003/0169763 A1 | 9/2003 | Choi et al. |
| 2003/0222831 A1 | 12/2003 | Dunlap |
| 2003/0224741 A1 | 12/2003 | Sugar et al. |
| 2004/0002357 A1 | 1/2004 | Benveniste |
| 2004/0029549 A1 | 2/2004 | Fikart |
| 2004/0120277 A1 | 6/2004 | Holur et al. |
| 2004/0196812 A1 | 10/2004 | Barber |
| 2004/0196813 A1 | 10/2004 | Ofek et al. |
| 2004/0240376 A1 | 12/2004 | Wang et al. |
| 2004/0242274 A1 | 12/2004 | Corbett et al. |
| 2005/0032479 A1 | 2/2005 | Miller et al. |
| 2005/0058111 A1 | 3/2005 | Hung et al. |
| 2005/0124294 A1 | 6/2005 | Wentink |
| 2005/0143014 A1 | 6/2005 | Li et al. |
| 2005/0195758 A1 | 9/2005 | Chitrapu |

(56) References Cited

U.S. PATENT DOCUMENTS

| | | |
|---|---|---|
| 2005/0227625 A1 | 10/2005 | Diener |
| 2005/0254442 A1 | 11/2005 | Proctor, Jr. et al. |
| 2005/0271056 A1 | 12/2005 | Kaneko |
| 2006/0072518 A1 | 4/2006 | Pan et al. |
| 2006/0098592 A1 | 5/2006 | Proctor, Jr. et al. |
| 2006/0099940 A1 | 5/2006 | Pfleging et al. |
| 2006/0132359 A1 | 6/2006 | Chang et al. |
| 2006/0132602 A1 | 6/2006 | Muto et al. |
| 2006/0172578 A1 | 8/2006 | Parsons |
| 2006/0187952 A1 | 8/2006 | Kappes et al. |
| 2006/0211430 A1 | 9/2006 | Persico |
| 2007/0001910 A1 | 1/2007 | Yamanaka et al. |
| 2007/0019664 A1 | 1/2007 | Benveniste |
| 2007/0035463 A1 | 2/2007 | Hirabayashi |
| 2007/0060158 A1 | 3/2007 | Medepalli et al. |
| 2007/0132643 A1 | 6/2007 | Durham et al. |
| 2007/0173199 A1 | 7/2007 | Sinha |
| 2007/0173260 A1 | 7/2007 | Love et al. |
| 2007/0210974 A1 | 9/2007 | Chiang |
| 2007/0223701 A1 | 9/2007 | Emeott et al. |
| 2007/0238482 A1 | 10/2007 | Rayzman et al. |
| 2007/0255797 A1 | 11/2007 | Dunn et al. |
| 2007/0268848 A1 | 11/2007 | Khandekar et al. |
| 2008/0109051 A1 | 5/2008 | Splinter et al. |
| 2008/0112380 A1 | 5/2008 | Fischer |
| 2008/0192707 A1 | 8/2008 | Xhafa et al. |
| 2008/0218418 A1 | 9/2008 | Gillette |
| 2008/0242342 A1 | 10/2008 | Rofougaran |
| 2009/0046673 A1 | 2/2009 | Kaidar |
| 2009/0052362 A1 | 2/2009 | Meier et al. |
| 2009/0075606 A1 | 3/2009 | Shtrom et al. |
| 2009/0232026 A1 | 9/2009 | Lu |
| 2009/0233475 A1 | 9/2009 | Mildon et al. |
| 2009/0291690 A1 | 11/2009 | Guvenc et al. |
| 2009/0315792 A1 | 12/2009 | Miyashita et al. |
| 2010/0029282 A1 | 2/2010 | Stamoulis et al. |
| 2010/0046650 A1 | 2/2010 | Jongren et al. |
| 2010/0067505 A1 | 3/2010 | Fein et al. |
| 2010/0085950 A1 | 4/2010 | Sekiya et al. |
| 2010/0091818 A1 | 4/2010 | Sen et al. |
| 2010/0103065 A1 | 4/2010 | Shtrom et al. |
| 2010/0103066 A1 | 4/2010 | Shtrom et al. |
| 2010/0136978 A1 | 6/2010 | Cho et al. |
| 2010/0151877 A1 | 6/2010 | Lee et al. |
| 2010/0167719 A1 | 7/2010 | Sun et al. |
| 2010/0171665 A1 | 7/2010 | Nogami |
| 2010/0171675 A1 | 7/2010 | Borja et al. |
| 2010/0189005 A1 | 7/2010 | Bertani et al. |
| 2010/0202613 A1 | 8/2010 | Ray et al. |
| 2010/0210147 A1 | 8/2010 | Hauser |
| 2010/0216412 A1 | 8/2010 | Rofougaran |
| 2010/0238083 A1 | 9/2010 | Malasani |
| 2010/0315307 A1 | 12/2010 | Syed et al. |
| 2010/0322219 A1 | 12/2010 | Fischer et al. |
| 2011/0006956 A1 | 1/2011 | McCown |
| 2011/0028097 A1 | 2/2011 | Memik et al. |
| 2011/0032159 A1 | 2/2011 | Wu et al. |
| 2011/0044186 A1 | 2/2011 | Jung et al. |
| 2011/0103309 A1 | 5/2011 | Wang et al. |
| 2011/0111715 A1 | 5/2011 | Buer et al. |
| 2011/0133996 A1 | 6/2011 | Alapuranen |
| 2011/0170424 A1 | 7/2011 | Safavi |
| 2011/0172916 A1 | 7/2011 | Pakzad et al. |
| 2011/0182260 A1 | 7/2011 | Sivakumar et al. |
| 2011/0182277 A1 | 7/2011 | Shapira |
| 2011/0194644 A1 | 8/2011 | Liu et al. |
| 2011/0241969 A1 | 10/2011 | Zhang et al. |
| 2011/0243291 A1 | 10/2011 | McAllister et al. |
| 2012/0008542 A1 | 1/2012 | Koleszar et al. |
| 2012/0040700 A1 | 2/2012 | Gomes et al. |
| 2012/0057533 A1 | 3/2012 | Junell et al. |
| 2012/0093091 A1 | 4/2012 | Kang et al. |
| 2012/0115487 A1 | 5/2012 | Josso |
| 2012/0134280 A1 | 5/2012 | Rotvold et al. |
| 2012/0140651 A1 | 6/2012 | Nicoara et al. |
| 2012/0238201 A1 | 9/2012 | Du et al. |
| 2012/0263145 A1 | 10/2012 | Marinier et al. |
| 2012/0282868 A1 | 11/2012 | Hahn |
| 2012/0299789 A1 | 11/2012 | Orban et al. |
| 2012/0314634 A1 | 12/2012 | Sekhar |
| 2013/0003645 A1 | 1/2013 | Shapira et al. |
| 2013/0005350 A1 | 1/2013 | Campos et al. |
| 2013/0023216 A1 | 1/2013 | Moscibroda et al. |
| 2013/0064161 A1 | 3/2013 | Hedayat et al. |
| 2013/0082899 A1 | 4/2013 | Gomi |
| 2013/0095747 A1 | 4/2013 | Moshfeghi |
| 2013/0128858 A1 | 5/2013 | Zou et al. |
| 2013/0176902 A1 | 7/2013 | Wentink et al. |
| 2013/0182652 A1 | 7/2013 | Tong et al. |
| 2013/0195081 A1 | 8/2013 | Merlin et al. |
| 2013/0210457 A1 | 8/2013 | Kummetz |
| 2013/0223398 A1 | 8/2013 | Li et al. |
| 2013/0271319 A1 | 10/2013 | Trerise |
| 2013/0286950 A1 | 10/2013 | Pu |
| 2013/0286959 A1 | 10/2013 | Lou et al. |
| 2013/0288735 A1 | 10/2013 | Guo |
| 2013/0301438 A1 | 11/2013 | Li et al. |
| 2013/0322276 A1 | 12/2013 | Pelletier et al. |
| 2013/0322413 A1 | 12/2013 | Pelletier et al. |
| 2014/0024328 A1 | 1/2014 | Balbien et al. |
| 2014/0051357 A1 | 2/2014 | Steer et al. |
| 2014/0098748 A1 | 4/2014 | Chan et al. |
| 2014/0145890 A1* | 5/2014 | Ramberg ............... H01Q 9/28 |
| | | 343/726 |
| 2014/0185494 A1 | 7/2014 | Yang et al. |
| 2014/0191918 A1 | 7/2014 | Cheng et al. |
| 2014/0198867 A1 | 7/2014 | Sturkovich et al. |
| 2014/0206322 A1 | 7/2014 | Dimou et al. |
| 2014/0225788 A1 | 8/2014 | Schulz et al. |
| 2014/0233613 A1 | 8/2014 | Fink et al. |
| 2014/0235244 A1 | 8/2014 | Hinman |
| 2014/0253378 A1 | 9/2014 | Hinman |
| 2014/0253402 A1 | 9/2014 | Hinman et al. |
| 2014/0254700 A1 | 9/2014 | Hinman et al. |
| 2014/0256166 A1 | 9/2014 | Ramos et al. |
| 2014/0320306 A1 | 10/2014 | Winter |
| 2014/0320377 A1 | 10/2014 | Cheng et al. |
| 2014/0355578 A1 | 12/2014 | Fink et al. |
| 2014/0355584 A1 | 12/2014 | Fink et al. |
| 2015/0002335 A1 | 1/2015 | Hinman et al. |
| 2015/0015435 A1 | 1/2015 | Shen et al. |
| 2015/0215952 A1 | 7/2015 | Hinman et al. |
| 2015/0256275 A1 | 9/2015 | Hinman et al. |
| 2015/0263816 A1 | 9/2015 | Hinman et al. |
| 2015/0319584 A1 | 11/2015 | Fink et al. |
| 2015/0321017 A1 | 11/2015 | Perryman et al. |
| 2015/0325945 A1 | 11/2015 | Ramos et al. |
| 2015/0327272 A1 | 11/2015 | Fink et al. |
| 2015/0365866 A1 | 12/2015 | Hinman et al. |
| 2016/0149634 A1 | 5/2016 | Kalkunte et al. |
| 2016/0149635 A1 | 5/2016 | Hinman et al. |
| 2016/0211583 A1 | 7/2016 | Lee et al. |
| 2016/0240929 A1 | 8/2016 | Hinman et al. |
| 2016/0338076 A1 | 11/2016 | Hinman et al. |
| 2016/0365666 A1 | 12/2016 | Ramos et al. |
| 2017/0048647 A1 | 2/2017 | Jung et al. |
| 2017/0201028 A1 | 7/2017 | Eberhardt et al. |
| 2017/0238151 A1 | 8/2017 | Fink et al. |
| 2017/0294975 A1 | 10/2017 | Hinman et al. |
| 2018/0034166 A1 | 2/2018 | Hinman |
| 2018/0035317 A1 | 2/2018 | Hinman et al. |

FOREIGN PATENT DOCUMENTS

| | | |
|---|---|---|
| CN | 105191204 A | 12/2015 |
| EM | 002640177 A1 | 2/2015 |
| EP | 1384285 B1 | 6/2007 |
| WO | WO2014137370 A1 | 9/2014 |
| WO | WO2014138292 A1 | 9/2014 |
| WO | WO2014193394 A1 | 12/2014 |
| WO | WO2015112627 A2 | 7/2015 |

(56) References Cited

FOREIGN PATENT DOCUMENTS

| WO | WO2017123558 A1 | 7/2017 |
|---|---|---|
| WO | WO2018022526 | 2/2018 |

OTHER PUBLICATIONS

Non-Final Office Action, dated Oct. 26, 2016, U.S. Appl. No. 15/139,225, filed Apr. 26, 2016.
Non-Final Office Action, dated Jan. 5, 2015, U.S. Appl. No. 14/183,445, filed Feb. 18, 2014.
Notice of Allowance, dated Jul. 13, 2015, U.S. Appl. No. 14/183,445, filed Feb. 18, 2014.
Non-Final Office Action, dated Jan. 15, 2015, U.S. Appl. No. 14/183,329, filed Feb. 18, 2014.
Notice of Allowance, dated Aug. 19, 2015, U.S. Appl. No. 14/183,329, filed Feb. 18, 2014.
Non-Final Office Action, dated Mar. 18, 2015, U.S. Appl. No. 14/183,375, filed Feb. 18, 2014.
Final Office Action, dated Nov. 24, 2015, U.S. Appl. No. 14/183,375, filed Feb. 18, 2014.
Advisory Action, dated Mar. 2, 2016, U.S. Appl. No. 14/183,375, filed Feb. 18, 2014.
Non-Final Office Action, dated Jan. 2, 2015, U.S. Appl. No. 13/925,566, filed Jun. 24, 2013.
Notice of Allowance, dated Jul. 15, 2015, U.S. Appl. No. 13/925,566, filed Jun. 24, 2013.
Non-Final Office Action, dated Dec. 11, 2013, U.S. Appl. No. 13/906,128, filed May 30, 2013.
Final Office Action, dated Apr. 15, 2014, U.S. Appl. No. 13/906,128, filed May 30, 2013.
Advisory Action, dated Jul. 31, 2014, U.S. Appl. No. 13/906,128, filed May 30, 2013.
Non-Final Office Action, dated Aug. 25, 2014, U.S. Appl. No. 13/906,128, filed May 30, 2013.
Final Office Action, dated Mar. 23, 2015, U.S. Appl. No. 13/906,128, filed May 30, 2013.
Notice of Allowance, dated Oct. 26, 2015, U.S. Appl. No. 13/906,128, filed May 30, 2013.
Non-Final Office Action, dated Jun. 16, 2014, U.S. Appl. No. 14/164,081, filed Jan. 24, 2014.
Notice of Allowance, dated Dec. 30, 2014, U.S. Appl. No. 14/164,081, filed Jan. 24, 2014.
Non-Final Office Action, dated Dec. 24, 2013, U.S. Appl. No. 14/045,741, filed Oct. 3, 2013.
Final Office Action, dated Apr. 16, 2014, U.S. Appl. No. 14/045,741, filed Oct. 3, 2013.
Non-Final Office Action, dated Sep. 22, 2014, U.S. Appl. No. 14/045,741, filed Oct. 3, 2013.
Notice of Allowance, dated Jun. 3, 2015, U.S. Appl. No. 14/045,741, filed Oct. 3, 2013.
Non-Final Office Action, dated Sep. 10, 2015, U.S. Appl. No. 14/198,378, filed Mar. 5, 2014.
Non-Final Office Action, dated Sep. 17, 2015, U.S. Appl. No. 14/741,423, filed Jun. 16, 2015.
Notice of Allowance, dated Jan. 11, 2016, U.S. Appl. No. 29/502,253, filed Sep. 12, 2014.
Non-Final Office Action, dated Mar. 16, 2016, U.S. Appl. No. 14/325,307, filed Jul. 7, 2014.
Notice of Allowance, dated Apr. 6, 2016, U.S. Appl. No. 14/198,378, filed Mar. 5, 2014.
Non-Final Office Action, dated Apr. 7, 2016, U.S. Appl. No. 14/639,976, filed Mar. 5, 2015.
Non-Final Office Action, dated Apr. 26, 2016, U.S. Appl. No. 14/802,829, filed Jul. 17, 2015.
Notice of Allowance, dated Jul. 26, 2016, U.S. Appl. No. 14/325,307, filed Jul. 7, 2014.
Notice of Allowance, dated Aug. 16, 2016, U.S. Appl. No. 14/802,829, filed Jul. 17, 2015.
Non-Final Office Action, dated Sep. 15, 2016, U.S. Appl. No. 14/183,375, filed Feb. 18, 2014.
Non-Final Office Action, dated Sep. 30, 2016, U.S. Appl. No. 14/657,942, filed Mar. 13, 2015.
Final Office Action, dated Oct. 12, 2016, U.S. Appl. No. 14/741,423, filed Jun. 16, 2015.
International Search Report and Written Opinion of the International Search Authority dated Nov. 26, 2013 in Patent Cooperation Treaty Application No. PCT/US2013/047406, filed Jun. 24, 2013, 9 pages.
International Search Report and Written Opinion of the International Search Authority dated Aug. 9, 2013 in Patent Cooperation Treaty Application No. PCT/US2013/043436, filed May 30, 2013, 13 pages.
International Search Report and Written Opinion of the International Search Authority dated Jul. 1, 2014 in Patent Cooperation Treaty Application No. PCT/US2014/020880, filed Mar. 5, 2014, 14 pages.
International Search Report and Written Opinion of the International Search Authority dated Jun. 29, 2015 in Patent Cooperation Treaty Application No. PCT/US2015/012285, filed Jan. 21, 2015, 15 pages.
Hinman et al., U.S. Appl. No. 61/774,632, filed Mar. 7, 2013, 23 pages.
First Official Notification dated Jun. 15, 2015 in Chinese Design Patent Application 201530058063.8, filed Mar. 11, 2015, 1 page.
Notice of Allowance dated Sep. 8, 2015 in Chinese Design Patent Application 201530058063.8, filed Mar. 11, 2015, 3 pages.
Weisstein, Eric "Electric Polarization", Retrieved from the Internet [retrieved Mar. 23, 2007] available at <http://scienceworld.wolfram.com/physics/ElectricPolarization.html>, 1 page.
Liu, Lingjia et al., "Downlink MIMO in LTE-Advanced: SU-MIMO vs. MU-MIMO," IEEE Communications Magazine, Feb. 2012, pp. 140-147.
International Search Report and "Written Opinion of the International Searching Authority," Patent Cooperation Treaty Application No. PCT/US2017/012884, dated Apr. 6, 2017, 9 pages.
Non-Final Office Action, dated Jul. 5, 2017, U.S. Appl. No. 14/848,202, filed Sep. 8, 2015.
Notice of Allowance, dated Jul. 31, 2017, U.S. Appl. No. 14/833,038, filed Aug. 21, 2015.
"Office Action," Chinese Patent Application No. 201580000078.6, Nov. 3, 2017, 5 pages [10 pages including translation].
"International Search Report" and "Written Opinion of the International Searching Authority," Patent Cooperation Treaty Application No. PCT/US2017/043560, Nov. 16, 2017, 11 pages.

\* cited by examiner

SYSTEM AND METHOD FOR DUAL-BAND BACKHAUL RADIO

CROSS REFERENCE TO RELATED APPLICATIONS

This Non-Provisional U.S. Patent Application is a continuation of and claims the benefit of Non-Provisional U.S. patent application Ser. No. 14/833,038, filed on Aug. 21, 2015, now U.S. Pat. No. 9,843,940, issued Dec. 12, 2017, which is a continuation of and claims the benefit of Non-Provisional U.S. patent application Ser. No. 14/183,329, filed on Feb. 18, 2014, now U.S. Pat. No. 9,191,081, issued Nov. 17, 2015, which claims the benefit of U.S. Provisional Application Ser. No. 61/775,408, filed on Mar. 8, 2013. All of the aforementioned disclosures are hereby incorporated by reference herein in their entireties including all references and appendices cited therein.

FIELD OF THE INVENTION

The present invention relates to systems and methods for a dual-band backhaul radio. In particular, the present system and method enables higher reliability data transmission radios by utilizing more than one frequency band to leverage uncorrelated interference between frequency bands.

BACKGROUND

MIMO systems in general utilize multiple antennae at both the transmitter and receiver to improve communication performance between the transmitter and receiver. MIMO systems may allow for the communication of different information on each of a plurality of antennae via the transmitter, even using the same frequency. These MIMO systems may compensate for both frequency and time discrepancies. Exemplary systems that utilize MIMO technology include, but are not limited to, wireless Internet service providers (ISP), worldwide interoperability for microwave access (WiMAX) systems, and 4G long-term evolution (LTE) data transmission systems.

A master antenna may include a baseband radio and two chains of communication through vertically and horizontally polarized antennas. The master antenna may have a connection for power and data communications, typically shared through an interface such as power-over-Ethernet. A slave antenna connected by coaxial cable to the master antenna includes circuitry to compensate for cable loss and split the transmit and receive paths. The slave antenna provides communication over another pair of vertically and horizontally polarized antennae. With adequate physical separation between the pair of dishes on each end of a long distance link, a phase angle difference between the vertical and horizontal antenna elements allows four distinct channels of communication to occur as a result of MIMO processing.

SUMMARY

According to some embodiments, the present technology may be directed to a method for multiple input multiple output (MIMO) multi-frequency transmission of data by a MIMO radio comprising a first and second set of antennae, wherein the first and second set of antennae each comprise a vertically polarized antenna and a horizontally polarized antenna. In some instances, the method includes: (a) transmitting or receiving data on the first set of antennae using a first frequency; and (b) transmitting or receiving the data on the second set of antennae using a second frequency.

The present technology may also be directed to a multiple input multiple output (MIMO) transceiver. The MIMO radio may include: (a) a processor; (b) a memory for storing multi-frequency transmission logic; (c) a first set of antennae comprising a first vertically polarized antenna and a first horizontally polarized antenna; (d) a second set of antennae comprising a second vertically polarized antenna and a second horizontally polarized antenna; (e) wherein the processor executes the multi-frequency transmission logic to cause the first set of antennae to transmit or receive data using a first frequency, and the second set of antennae to transmit or receive the data using a second frequency.

The present technology may also be directed to a wireless network that includes a plurality of MIMO radios, each comprising: (a) a processor; (b) a memory for storing multi-frequency transmission logic; (c) a first set of antennae comprising a first vertically polarized antenna and a first horizontally polarized antenna, the first set of antennae being configured to transmit or receive data using a first frequency; (d) a second set of antennae comprising a second vertically polarized antenna and a second horizontally polarized antenna, the first set of antennae being configured to transmit or receive data using a first frequency which is different from the first frequency; and (e) wherein a first portion of the MIMO radios are configured to transmit data using their first and second sets of antennae, while a second portion of the MIMO radios are configured to receive data from the first portion of the MIMO radios using their first and second sets of antenna.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DESCRIPTION

Figure 1:
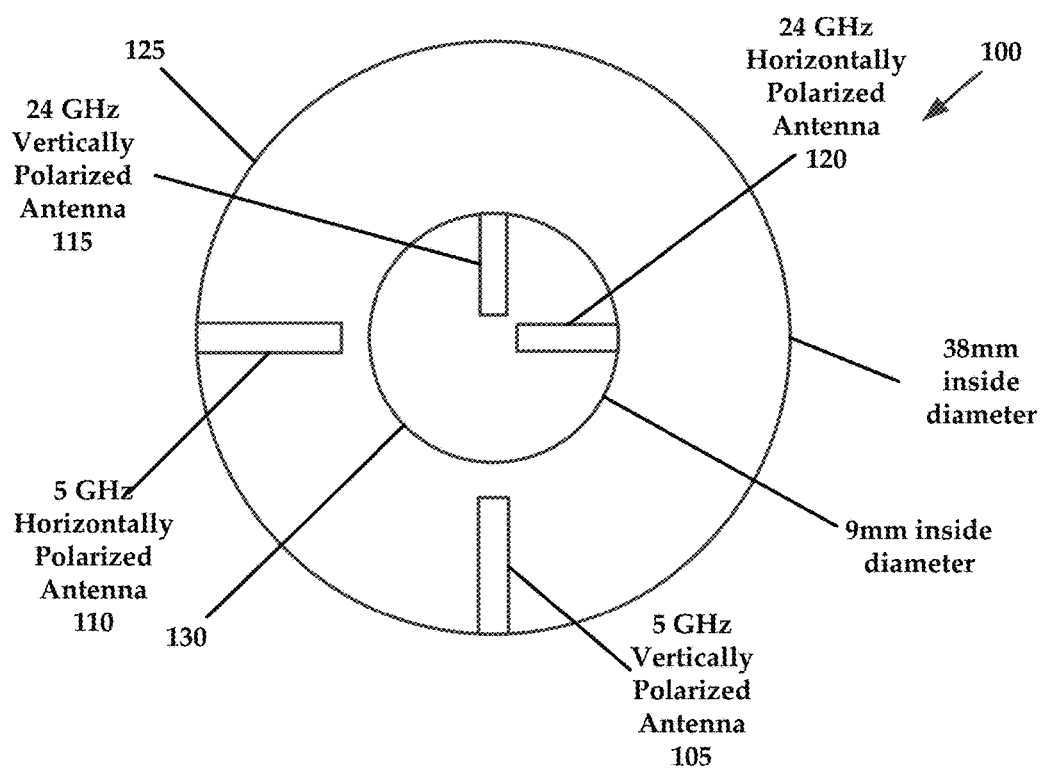
FIG. 1 is a top plan view of single dish radio illustrating two concentric and coaxial waveguides and an exemplary arrangement of two antenna probes in each waveguide.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

A dual-band 5 GHz and 24 GHz system (MIMO radio), using 4×4 MIMO 802.11 ac, provides four-stream communication. The system places two signals in orthogonal polarizations within each band. Because the outage conditions in the two bands are uncorrelated (24 GHz fades with rain, 5 GHz is impaired by manmade interference), the dual-band radio can provide higher reliability than a single-band radio. Using the provided dual-band backhaul radio, a 1 Gb/sec. transmission rate is possible.

Figure 6:
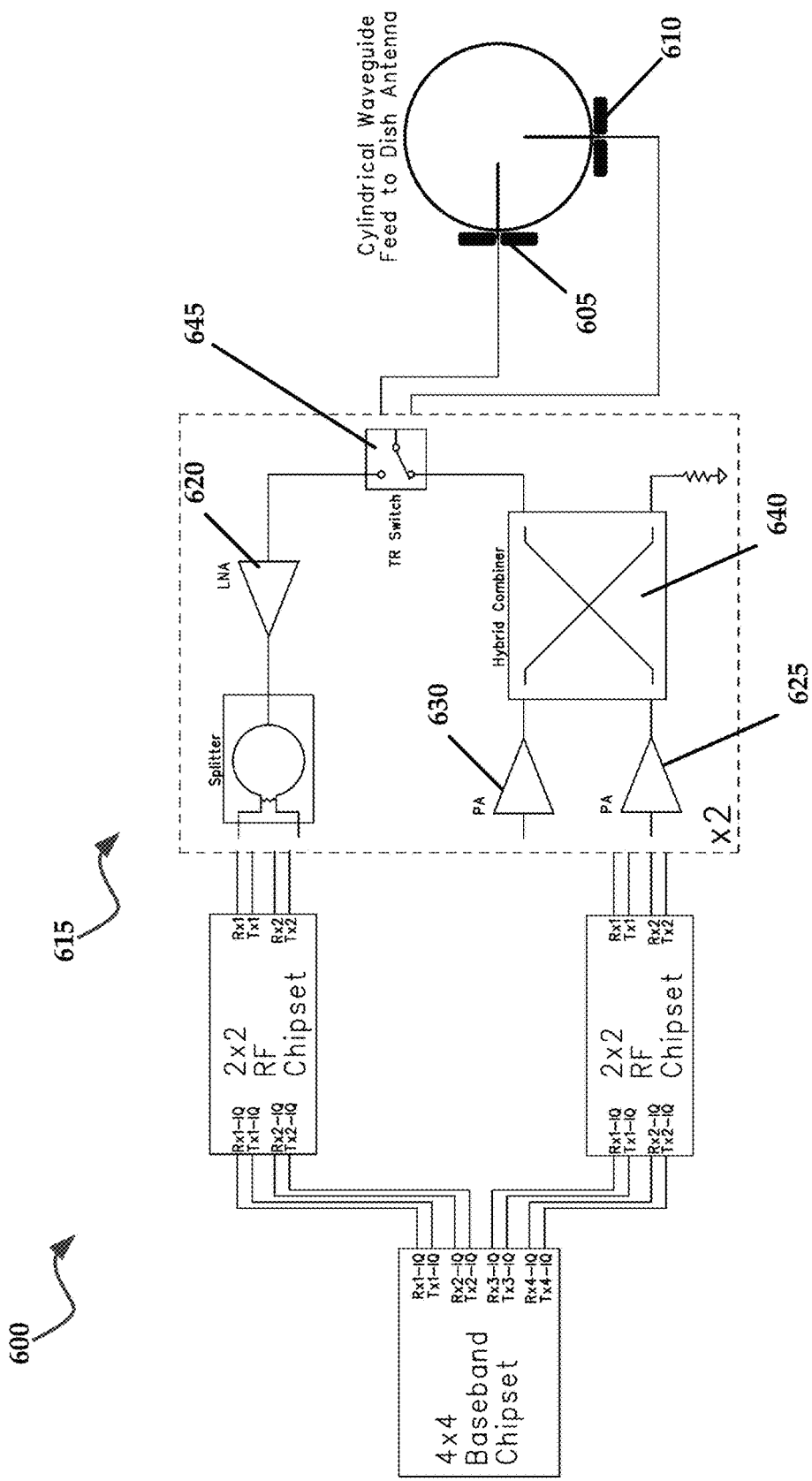
FIG. 6 illustrates a block diagram for a dual-channel 5 GHz only system.

Similarly, such as the system 600 of FIG. 6, a dual-channel 5 GHz only system (MIMO radio), using a 4×4 MIMO 802.11 ac, provides four-stream communication. The system places two signals in orthogonal polarization using two orthogonal antennas, such as antenna 605 and 610, each antenna transmitting or receiving on dual channels in the same 5 GHz band. Such a system is realized utilizing a single 4×4 baseband processor and dual 2×2 RF converters tuned to different channels in the 5 GHz band. A custom RF front-end 615 is utilized that provides an optimal performance on receiver noise figure, by sharing a low noise amplifier 620 for dual channels on the same polarization, while distinct power amplifiers 625 and 630 provide enough isolation between the dual channels to avoid intermodulation distortion. Outputs of the power amplifiers are combined using a hybrid coupler 640 before going to a transmit-receive switch 645 utilized in TDD systems, thus exploiting the same antennae for dual channels. Since 5 GHz impairments are channel specific, the dual-band radio utilizes two channels and can thus provide higher reliability than a single-band radio. Using the provided dual-band backhaul radio, a 1 Gb/sec. transmission rate is possible.

The present technology provides a 4×4 MIMO transmission by making the four chains orthogonal through both polarization and frequency. A four stream MIMO link is typically communicated through four transmit and four receive antennas that are not necessarily orthogonal, but which have adequate spatial diversity to allow a pre- and post-processing of the signals to create orthogonality. In the dual-band radio conceived here, the pre- and post-processing may be minimal, since two polarizations (orthogonal) are on one band, and two polarizations (orthogonal) are on another band. The frequency separation creates orthogonality. Two reasons to use a 4×4 MIMO radio are (a) it is a relatively inexpensive and available way to aggregate four data streams, and (b) there is likely to be some rotation of the antenna polarizations from end-to-end, which requires a matrix rotation to bring them back into orthogonality before demodulation. The four data streams using two different frequencies and different polarizations within each frequency are inherently orthogonal, which facilitates processing. In particular, a QAM (Quadrature Amplitude Modulation) decoder may be used to separate the four data streams from a dual-band 4×4 MIMO radio.

An exemplary implementation of the dual-band radio could be with either two dishes (one for each band), or just a single dish. The two dish solution is simpler to implement, but the single dish may be more desirable due to reduced hardware requirements.

Figure 2:
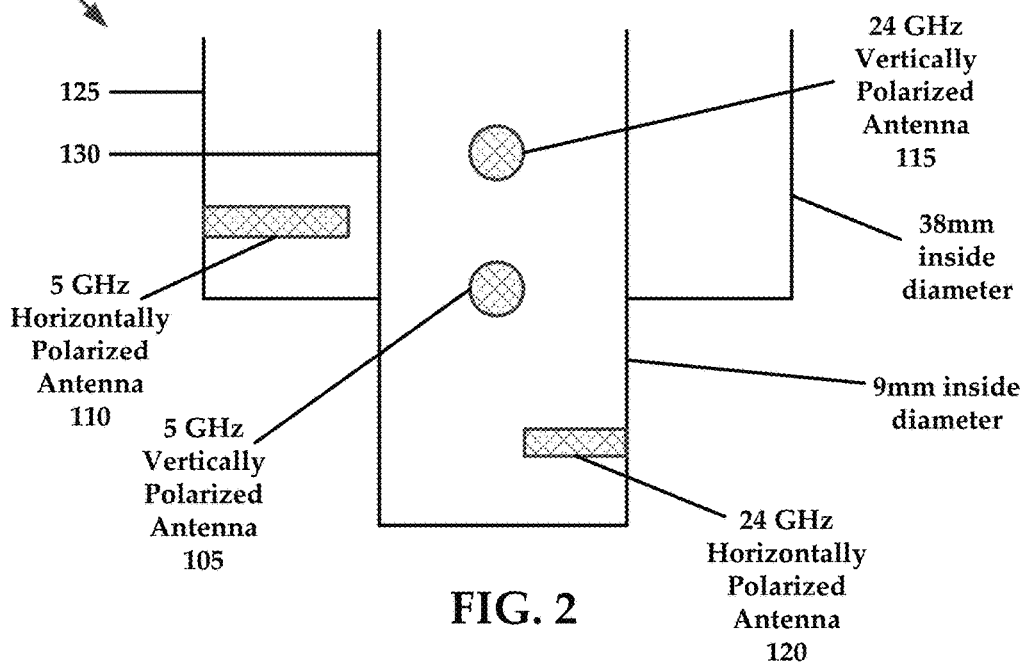
FIG. 2 is a cross-sectional side view of single dish radio of FIG. 1 in which the two vertical polarized waveguides.

FIGS. 1 and 2 collectively illustrate an exemplary embodiment of a single dish design of a dual-band 4×4 MIMO radio 100 for a 5 GHz and 24 GHz system. In single dish radio 100 there may be four antenna probes in coaxial waveguides, for example. Two smaller probes for 24 GHz, which may be about 3 mm long, are placed in horizontal and vertical orientations (or any other 90 degree arrangement) in the inside waveguide. That is, the radio 100 may include a first vertically polarized antenna 105 and a first horizontally polarized antenna 110.

Two longer probes for 5 GHz, which may be about 12 mm long, are in the outer annular region. The energy from all four probes may then hit a sub-reflector, or feed directly to a primary dish. More specifically, the radio 100 may include a second vertically polarized antenna 115 and a second horizontally polarized antenna 120. These two antennae may be referred to as the first set of antennae.

FIG. 1 is a top view of single dish radio 100 illustrating the two concentric and coaxial waveguides 125 and 130, and an exemplary arrangement of two antenna probes in each waveguide. For example, an outer waveguide 125 is configured to receive the first set of antennae, which includes the first vertically polarized antenna 105 and the first horizontally polarized antenna 110. These two antennae may be spaced apart from one another in vertical positioning to enhance spatial diversity. Similarly, the radio 100 may include an inner waveguide 130 that is configured to receive the second set of antennae, which includes the second vertically polarized antenna 115 and the second horizontally polarized antenna 120. These two antennae may be spaced apart from one another in vertical positioning to enhance spatial diversity.

In FIGS. 1 and 2, the inner diameter of the outer waveguide 125 may be 38 millimeters, and the inner diameter of the inner waveguide may be 9 millimeters. Two 5 GHz antenna probes may be arranged in the outer waveguide 125 in a horizontal and a vertical position, and two 24 GHz antenna probes may be arranged in the inner waveguide 130 in a horizontal and a vertical position, as described above. The two vertical antenna probes may be arranged on opposite sides of their respective waveguides, and likewise the two horizontal probes may be arranged on opposite sides of their respective waveguides. Still further alternative arrangements are possible.

Figure 3:
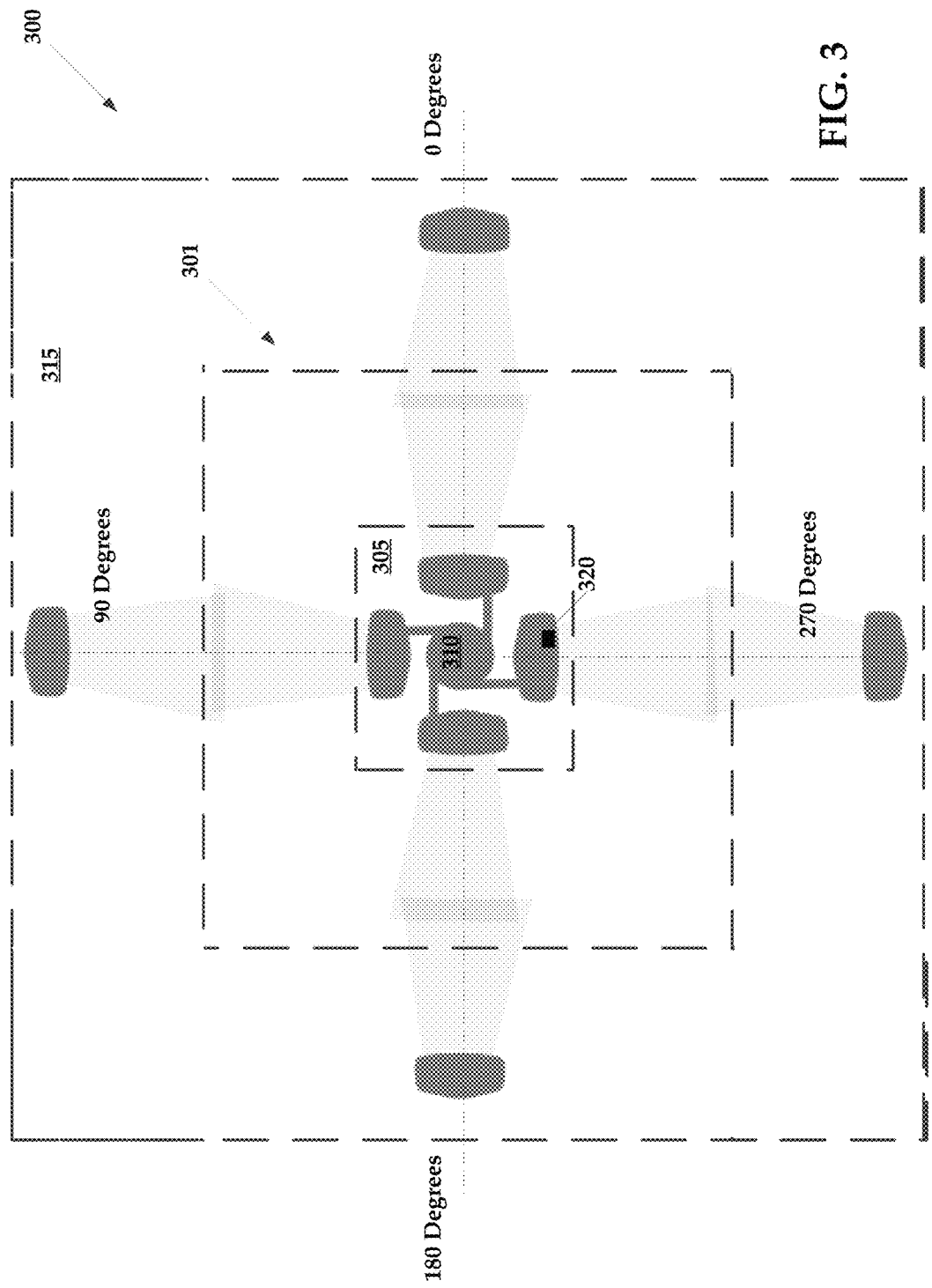
FIG. 3 illustrates an exemplary a portion of an exemplary 4×4 MIMO radio system for practicing aspects of the present technology.

Four single dish radios 100 may be positioned at one location according to FIG. 3, or in an alternative arrangement. Alternatively, each single dish radio 100 may be directed at another dual-band radio, for example another single dish radio 100, at another location. By the virtue of the polarization and frequency diversity, an 80 MHz radio (in two bands), for example, can provide the equivalent throughput of a 320 MHz radio operating with a single polarization. Furthermore, even in a two dish embodiment, the two dishes may not need to be physically separated since the orthogonality is occurring in frequency, rather than using MIMO processing to create orthogonality from spatial diversity alone.

Telecommunication carriers and/or Internet service providers want high reliability. Unlicensed spectrum includes both 5 GHz and 24 GHz, and these two bands have different impairments. 24 GHz is weather-sensitive (e.g., suffers impairment due to rain), and has limited power transmission. 5 GHz is affected by consumer interference, since this band is shared with consumer electronics. Since the two bands have uncorrelated failure modes, used together they have higher net reliability. In particular, using 5 GHz and 24 GHz together in a 4×4 MIMO radio with two polarized streams in one band and two polarized streams in another band provides improved reliability and data throughput.

FIG. 3 illustrates an exemplary a portion of an exemplary 4×4 MIMO radio system for practicing aspects of the present technology, such as providing a wireless network 301. As shown in FIG. 3, an exemplary 4×4 MIMO radio system 300 may comprise a plurality of transmitters 305, which are associated with a structure 310, such as a tower. In some instances, each of the transmitters associated with the plurality of transmitters 305 are disposed at an angle of 90 degrees relative to adjacent transmitters. For example, a first transmitter may be disposed on the structure 310 such that the centerline of the first transmitter extends along a reference line corresponding to zero degrees. Three additional transmitters may be disposed at 90 degree increments around the structure 310. In exemplary embodiments, two of the transmitters are 5 GHz transmitters, and the remaining two transmitters are 24 GHz transmitters. The transmitters having the same frequency may be positioned at 90 degrees with respect to each other, or alternatively may be positioned on opposite sides of structure 310 (e.g., at 180 degrees). In still further alternatives, each transmitter shown in FIG. 3 may comprise two transmitters, which may be stacked vertically in which each of the two transmitters operates at a different frequency than the other transmitter.

Correspondingly, the system 300 may also comprise a plurality of receivers 315, which are disposed outwardly from the plurality of transmitters 305. Each of the plurality of receivers 315 are positioned such that they are in substantial alignment with at least one of the plurality of transmitters 305.

In accordance with the present technology, the plurality of transmitters 305 may be configured to transmit simultaneously. That is, the plurality of transmitters 305 may transmit data on the same channel (e.g., frequency) as one another. According to exemplary embodiments of the present technology, some of the transmitters may transmit on one frequency, while other transmitters transmit on a second frequency. In exemplary embodiments, one of the frequencies is 5 GHz, and the other is 24 GHz, and in further exemplary embodiments, two of the transmitters are 5 GHz, and the two others are 24 GHz.

Advantageously, the plurality of transmitters 305 may transmit different data from one another, which increases the volume and diversity of data that can be transmitted at the same time. It will be understood that collocated transmitters (or receivers) may be grouped together according to a common time reference, such as a time slot. That is, collocated transmitters may be configured to transmit simultaneously according to a schedule.

The spacing of the plurality of transmitters 305 and careful timing of the data transmissions allow for simultaneous transmission of different data using the same channel. It will be understood that using transmitters 305 having adequate side lobe radiation rejection may enhance the efficacy of data transmissions of the system 300.

Similarly to the plurality of transmitters 305, the plurality of receivers 315 may be configured to receive data simultaneously relative to one another. In some instances, the system 300 may be synchronized such that when the plurality of transmitters 305 are transmitting simultaneously, the plurality of receivers 315 are configured to receive simultaneously.

An exemplary system, such as the system 300 of FIG. 3, in operation may provide in the 80 megahertz spectrum, 802.11ac wireless data transmission having TCP/IP bandwidth of approximately 4.8 Gbps, which includes 2.4 Gbps of upload bandwidth and 2.4 Gbps of download bandwidth, assuming the transmit/receive workload of the system 300 is split evenly at 50 percent transmit and 50 percent receive. Advantageously, the available bandwidth of the system 300 may be selectively adjusted such that more bandwidth may be dedicated to download bandwidth. For example, the bandwidth split may be selectively adjusted such that the download bandwidth is 70 percent of the total bandwidth of the system 300 while the upload bandwidth is approximately 30 percent. Such selective adjustment allows for fine tuning of the system 300 to service the needs of end users. For example, when end users frequently consume more download bandwidth than upload bandwidth, the download bandwidth may be increased. This bandwidth split may be automatically varied according to the empirical end user behavior.

According to some embodiments, the system 300 may implement signal synchronization using, for example, GPS time references. The system 300 may obtain GPS time references from a GPS satellite system (not shown). A GPS receiver 320 may be associated with each transmitter and receiver individually and may be utilized to obtain GPS time references from the GPS satellite system. In contrast to systems that utilize a common GPS receiver to provide GPS information to a plurality of devices, integrating the GPS receiver 320 within a device itself advantageously eliminates time deltas present in systems that require the transmission of GPS information from a GPS receiver to a desired device. That is, wired or wireless transmission of GPS information between a main GPS receiver and a plurality of devices introduces timing delays.

After placement or installation of the various transmitters and receivers of the system 300, each transmitter may be configured to execute a configuration cycle in order to communicatively couple itself with the system 300. The configuration cycle may include execution of a site survey, where the device determines whether it is a transmitter or receiver. Because the devices used herein (such as the device of FIGS. 1-C) may operate as a transmitter or a receiver, the device may initially determine whether it has been purposed as a transmitter or a receiver. The device may be pre-loaded (executable instructions stored in memory) with an augmented service identifier (SSID) information set. Rather than just including a typical identifier that is used to uniquely identify a device on a network, the augmented SSID information set of the present technology may additionally include location information (e.g., latitude and longitude) as well as a mode of operation and security type (e.g., security protocol used by the device). The location information may allow the device to deduce or determine additional devices with which the device has been collocated. If the device is replacing another device, a mode of operation instruction set may be provided to the replacement device that informs the device of its required mode of operation.

The mode of operation may inform the device of its broadcast and/or receiving schedules, as well as channel information, such as the shared channel utilized by the plurality of devices.

According to some embodiments, the device may, upon power up, enter into scan mode to determine a list of collocated devices, as well as broadcast its own SSID to other collocated devices. The device may then exit the scan mode and perform a manual rescan, listing for configuration information. The device may reset configuration details to default or factory settings. In other instances, the configuration details determined by the device during the scan session may be installed or accepted by the device.

In some instances, if a device needs to determine its location information, the device may be configured to broadcast ping signals that are received by, for example, receivers that are not collocated with the device. Using the time differential between transmission of a ping signal by a device, relative to receiving of the ping signal by a receiver, an approximate distance between devices may be determined. Again, a GPS counter may track the broadcast and receipt of signals. The system may compare the GPS time references associated with the broadcast and received signals to determine distance values.

In other embodiments, each device (transmitter or receiver) may utilize a media access control (MAC) layer protocol that uses GPS coordinates. When a site survey is conducted, the latitude and longitude of each transmitter and receiver is shown on a map, which may be displayed via a graphical user interface. In other instances, the site survey data points may be stored in a log file.

Figure 4:
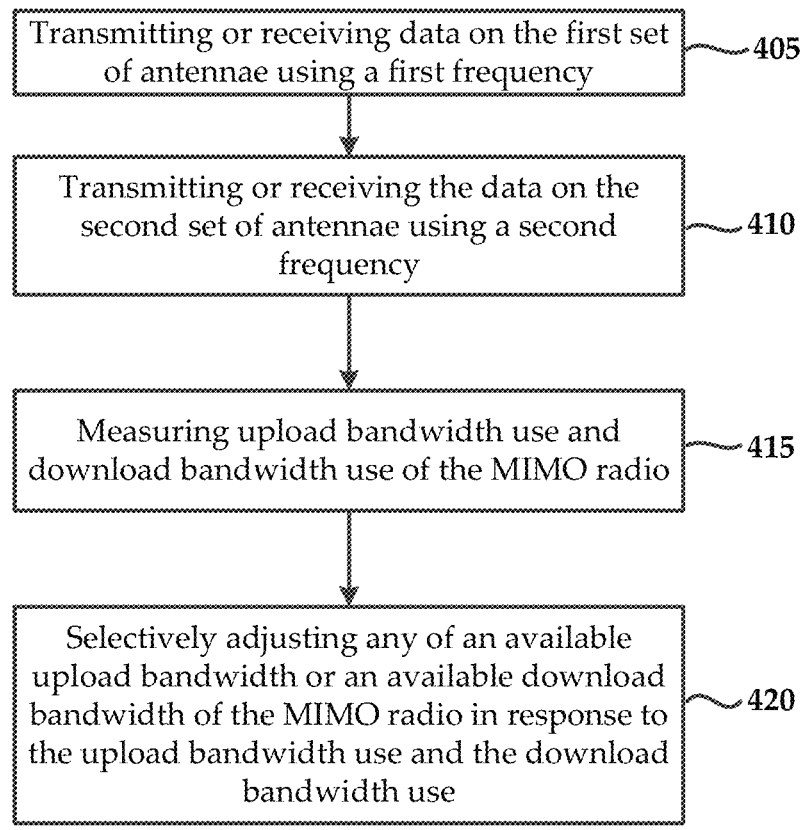
FIG. 4 is a flowchart of an exemplary method for multiple input multiple output (MIMO) multi-frequency transmission of data.

FIG. 4 is a flowchart of an exemplary method for multiple input multiple output (MIMO) multi-frequency transmission of data by a MIMO radio. It will be understood that the MIMO radio may include any of the MIMO receivers/transmitters described above. In some instances, the MIMO radio may include at least comprise a first and second set of antennae, where the first and second set of antennae each comprise a vertically polarized antenna and a horizontally polarized antenna.

According to some embodiments, the method may include transmitting or receiving 405 data on the first set of antennae using a first frequency. In some instances, the first frequency may include 5 GHz. Simultaneously, or substantially so, the method includes transmitting or receiving 410 the data on the second set of antennae using a second frequency. The second frequency may include, for example, 24 GHz. When the same data is transmitted using the first and second sets of antennae operating on separate frequencies, a diversity of frequency is produced, which may at least partially compensate for interference of signals transmitted on any one given frequency.

According to some embodiments, the method may include measuring 415 upload bandwidth use and download bandwidth use of the MIMO radio, or a plurality of MIMO radios in a wireless network. That is, the MIMO radio may be configured to monitor the actual download/upload performance of one or more MIMO radios and use this information as a basis to adjust the performance of the MIMO radios. Thus, in some embodiments, the method may include selectively adjusting 420 any of an available upload bandwidth or an available download bandwidth of the MIMO radio in response to the upload bandwidth use and the download bandwidth use.

Figure 5:
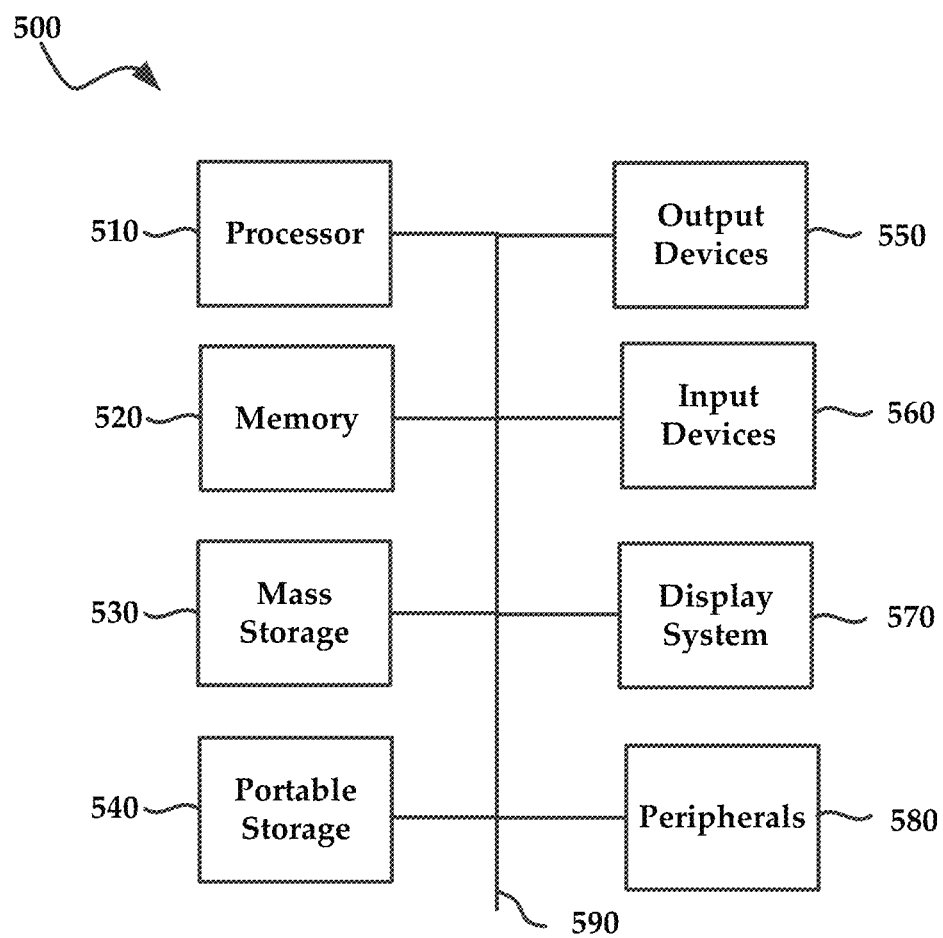
FIG. 5 illustrates an exemplary computing system that may be used to implement embodiments according to the present technology.

FIG. 5 illustrates an exemplary computing system 500, hereinafter system 500 that may be used to implement embodiments of the present invention. The system 500 may be implemented in the contexts of the likes of computing systems, networks, servers, or combinations thereof. The system 500 may include one or more processors 510 and main memory 520. Main memory 520 stores, in part, instructions and data for execution by processor 510. Main memory 520 may store the executable code when in operation. The system 500 may further includes a mass storage device 530, portable storage device(s) 540, output devices 550, user input devices 560, a graphics display 570, and peripheral device(s) 580.

The components shown in FIG. 5 are depicted as being connected via a single bus 590. The components may be connected through one or more data transport means. Processor 510 and main memory 520 may be connected via a local microprocessor bus, and the mass storage device 530, peripheral device(s) 580, portable storage device 540, and graphics display 570 may be connected via one or more input/output (I/O) buses.

Mass storage device 530, which may be implemented with a magnetic disk drive or an optical disk drive, is a non-volatile storage device for storing data and instructions for use by processor 510. Mass storage device 530 may store the system software for implementing embodiments of the present invention for purposes of loading that software into main memory 520.

Portable storage device 540 operates in conjunction with a portable non-volatile storage medium, such as a floppy disk, compact disk, digital video disc, or USB storage device, to input and output data and code to and from the system. The system software for implementing embodiments of the present invention may be stored on such a portable medium and input to the system 500 via the portable storage device 540.

User input devices 560 provide a portion of a user interface. User input devices 560 may include one or more microphones, an alphanumeric keypad, such as a keyboard, for inputting alpha-numeric and other information, or a pointing device, such as a mouse, a trackball, stylus, or cursor direction keys. User input devices 560 may also include a touchscreen. Additionally, the system 500 as shown in FIG. 5 includes output devices 550. Suitable output devices include speakers, printers, network interfaces, and monitors.

Graphics display 570 may include a liquid crystal display (LCD) or other suitable display device. Graphics display 570 receives textual and graphical information, and processes the information for output to the display device.

Peripheral devices 580 may be included and may include any type of computer support device to add additional functionality to the computer system.

The components provided in the system 500 are those typically found in computer systems that may be suitable for use with embodiments of the present invention and are intended to represent a broad category of such computer components that are well known in the art. Thus, the system 500 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, nonvolatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), Blu-ray Disc (BD), any other optical storage medium, RAM, PROM, EPROM, EEPROM, FLASH memory, and/or any other memory chip, module, or cartridge.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

What is claimed is:

1. A method for multiple input multiple output (MIMO) multi-frequency transmission of data by a MIMO radio comprising a first and second set of antennas, wherein the first and second set of antennas each comprise a vertically polarized antenna and a horizontally polarized antenna, the method comprising:
   transmitting or receiving data on the first set of antennas using a first frequency;
   transmitting or receiving the data on the second set of antennas using a second frequency;
   providing isolation between each of the first frequency and the second frequency to avoid intermodulation distortion; and
   wherein the first frequency is a single channel in a 5 Ghz band and the second frequency is another channel in the same 5 Ghz band, wherein the channels share the first and second set of antennas such that a single antenna on each polarization is utilized, for a total of two antennas.

2. The method according to claim 1, wherein the first frequency is 5 Ghz and the second frequency is 24 Ghz.

3. The method according to claim 1, further comprising transmitting additional data on either the first or second set of antennas, the additional data being different from the data.

4. The method according to claim 1, further comprising executing instructions stored in non-transitory memory of the MIMO radio, wherein execution of the instructions causes the MIMO radio to perform operations comprising broadcasting an augmented SSID to other collocated MIMO radios, wherein the augmented SSID includes a unique device identifier and any of a broadcast operation mode and a security type used by the MIMO radio.

5. A multiple input multiple output (MIMO) radio, comprising:
   a processor;
   a non-transitory memory for storing multi-frequency transmission logic;
   two 2×2 radio frequency (RF) converters each tuned to a unique channel in a 5 GHz band;
   a first set of antennas comprising a first vertically polarized antenna and a first horizontally polarized antenna;
   a second set of antennas comprising a second vertically polarized antenna and a second horizontally polarized antenna; and
   wherein the processor executes the multi-frequency transmission logic to cause the first set of antennas to transmit or receive data using one of the unique channels, and the second set of antennas to transmit or receive the data using another of the unique channels, as well as measure upload bandwidth use and download bandwidth use of the MIMO radio and selectively adjust any of an available upload bandwidth or an available download bandwidth of the MIMO radio in response to the upload bandwidth use and the download bandwidth use.

6. The MIMO radio according to claim 5, further comprising a concentric waveguide having an inner waveguide and an outer waveguide, wherein the first set of antennas are disposed within the outer waveguide and the second set of antennas are disposed within the inner waveguide.

7. The MIMO radio according to claim 5, wherein the first vertically polarized antenna and the first horizontally polarized antenna of the first set of antennas are positioned on opposing sides of an inner waveguide.

8. The MIMO radio according to claim 5, wherein the second vertically polarized antenna and the second horizontally polarized antenna of the second set of antennas are positioned on opposing sides of an outer waveguide.

9. The MIMO radio according to claim 5, wherein the first vertically polarized antenna and the first horizontally polarized antenna of the first set of antennas are spaced apart from one another to create spatial diversity and the second vertically polarized antenna and the second horizontally polarized antenna of the second set of antennas are spaced apart from one another to create spatial diversity, wherein the spatial diversity of the first and second sets of antennas enhance signal orthogonality.

10. The MIMO radio according to claim 5, wherein either the first or second set of antennas are configured to transmit additional data, the additional data being different from the data.

11. The MIMO radio according to claim 5, wherein the processor further executes the multi-frequency transmission logic to perform a configuration cycle that includes executing a site survey to determine if the MIMO radio is to operate as a transmitter or a receiver.

12. A wireless network, comprising:
a radio frequency (RF) front-end that shares a low noise amplifier for each unique channel utilized by a plurality of MIMO radios in orthogonal polarization, each comprising:
a processor;
a non-transitory memory for storing multi-frequency transmission logic wherein the processor executes the multi-frequency transmission logic to broadcast an augmented SSID to other collocated MIMO radios, wherein the augmented SSID includes a unique device identifier and any of a broadcast operation mode and a security type used by an MIMO radio, wherein the augmented SSID further comprises any of a broadcast or receive schedule, channel information, and shared channel information that is utilized by the MIMO radio as well as the other collocated MIMO radios;
a first set of antennas comprising a first vertically polarized antenna and a first horizontally polarized antenna, the first set of antennas being configured to transmit or receive data using a first frequency;
a second set of antennas comprising a second vertically polarized antenna and a second horizontally polarized antenna, the second set of antennas being configured to transmit or receive data using a second frequency which is different from the first frequency; and
wherein a first portion of the MIMO radios are configured to transmit data using their first and second sets of antennas, while a second portion of the MIMO radios are configured to receive data from the first portion of the MIMO radios using their first and second sets of antennas.

13. A dual-channel 5 GHz system, comprising:
two antennas in orthogonal polarization;
a 4×4 baseband processor;
two 2×2 radio frequency (RF) converters each tuned to a unique channel in a 5 GHz band;
an RF front-end that shares a low noise amplifier for each of the unique channels; and
power amplifiers that provide isolation between each of the unique channels to avoid intermodulation distortion.

14. The system according to claim 13, further comprising a hybrid coupler associated with outputs of the power amplifiers.

15. The system according to claim 14, further comprising a transmit-receive switch communicatively coupled with the hybrid coupler.

16. The system according to claim 13, wherein two polarizations are on a first of the unique channels and another two polarizations are on a second of the unique channels.

17. The system according to claim 13, further comprising a quadrature amplitude modulation decoder that separates four streams created by the dual-channel 5 GHz system.

18. A method for multiple input multiple output (MIMO) multi-frequency transmission of data by a MIMO radio comprising a first and second set of antennas, wherein the first and second set of antennas each comprise a vertically polarized antenna and a horizontally polarized antenna, the method comprising:
transmitting or receiving data on the first set of antennas using a first frequency;
transmitting or receiving the data on the second set of antennas using a second frequency;
providing isolation between each of the first frequency and the second frequency to avoid intermodulation distortion; and
wherein if multiple channels are used within a same band, an RF front-end performance per polarization is optimized using a shared low-noise amplifier between channels to create a best noise figure, and distinct power amplifiers between channels, combined at an output, for best distortion performance.

19. A method for multiple input multiple output (MIMO) multi-frequency transmission of data by a MIMO radio comprising a first and second set of antennas, wherein the first and second set of antennas each comprise a vertically polarized antenna and a horizontally polarized antenna, the method comprising:
transmitting or receiving data on the first set of antennas using a first frequency;
transmitting or receiving the data on the second set of antennas using a second frequency;
providing isolation between each of the first frequency and the second frequency to avoid intermodulation distortion;
measuring upload bandwidth use and download bandwidth use of the MIMO radio; and
selectively adjusting any of an available upload bandwidth or an available download bandwidth of the MIMO radio in response to the upload bandwidth use and the download bandwidth use.

20. The method according to claim 19, further comprising broadcasting an augmented SSID, the augmented SSID comprising any of a broadcast or receive schedule, channel information, and shared channel information that is utilized by the MIMO radio as well as other collocated MIMO radios.

21. A method for multiple input multiple output (MIMO) multi-frequency transmission of data by a MIMO radio comprising a first and second set of antennas, wherein the first and second set of antennas each comprise a vertically polarized antenna and a horizontally polarized antenna, the first and second set of antennas being in orthogonal polarization, the method comprising:
executing a configuration cycle that comprises performing a site survey to determine if the MIMO radio is to operate as a transmitter or a receiver;
transmitting or receiving data on the first set of antennas using a first frequency; and
transmitting or receiving the data on the second set of antennas using a second frequency.

* * * * *